US012708855B2

(12) United States Patent
O'Hagan

(10) Patent No.: US 12,708,855 B2
(45) Date of Patent: Aug. 18, 2026

(54) SYSTEM AND METHOD OF INCENTING POSITIVE DRIVING BEHAVIOUR

(71) Applicant: Sean O'Hagan, Saskatoon (CA)

(72) Inventor: Sean O'Hagan, Saskatoon (CA)

( * ) Notice: Subject to any disclaimer, the term of this patent is extended or adjusted under 35 U.S.C. 154(b) by 170 days.

(21) Appl. No.: 18/825,658

(22) Filed: Sep. 5, 2024

(65) Prior Publication Data

US 2025/0073602 A1 Mar. 6, 2025

(51) Int. Cl.
*A63F 13/798* (2014.01)
*A63F 13/65* (2014.01)
*A63F 13/803* (2014.01)

(52) U.S. Cl.
CPC ............ *A63F 13/798* (2014.09); *A63F 13/65* (2014.09); *A63F 13/803* (2014.09)

(58) Field of Classification Search
None
See application file for complete search history.

(56) References Cited

U.S. PATENT DOCUMENTS

2014/0194198 A1* 7/2014 Gale ...................... G06Q 10/40 463/29
2025/0065898 A1* 2/2025 Powell .................. B60W 40/09

* cited by examiner

*Primary Examiner* — Stephen T. Reed
(74) *Attorney, Agent, or Firm* — Suiter Swantz IP

(57) ABSTRACT

A method for gamifying driver speed compliance through a centralized computer system that interacts with photo radar capture devices. The system records vehicle speed and license plate data, categorizing speed readings as either compliant or non-compliant based on predefined speed limits. Each vehicle is assigned a speed compliance score, stored in a database, which is adjusted according to the vehicle's adherence to speed regulations. Positive compliance results in credit accumulation, while speeding incurs debits. Periodically, vehicles with positive compliance scores are eligible for rewards, which are distributed based on random selection or predefined criteria. This gamification approach incentivizes adherence to speed limits, thereby promoting safer driving habits, reducing road accidents, and minimizing environmental impact by lowering fuel consumption and emissions.

11 Claims, 2 Drawing Sheets

SYSTEM AND METHOD OF INCENTING POSITIVE DRIVING BEHAVIOUR

CROSS-REFERENCE TO RELATED APPLICATION

This nonprovisional application claims the benefit of priority of Canadian Application No. 3,211,032 filed Sep. 5, 2023, which is hereby incorporated by reference in its entirety.

FIELD OF THE INVENTION

The present invention relates to systems and methods for promoting adherence to traffic regulations, specifically through the gamification of driver speed compliance. The invention is designed to enhance road safety by incentivizing drivers to comply with posted speed limits. It leverages photo radar capture technology and a centralized computer system to monitor, record, and reward positive driving behaviors. This approach is particularly useful in reducing speeding-related accidents, encouraging safe driving habits, and mitigating the environmental impacts of excessive speed, such as increased fuel consumption and greenhouse gas emissions.

BACKGROUND OF THE INVENTION

Speeding remains one of the leading causes of road accidents globally. When drivers exceed posted speed limits, the likelihood of accidents increases due to reduced reaction time, longer stopping distances, and a diminished ability to safely navigate obstacles or curves in the road. The consequences of high-speed collisions are often severe, leading to significant injury or death not only for the drivers but also for passengers, pedestrians, and other road users. This problem is particularly acute in sensitive areas such as school zones, residential neighborhoods, and high-traffic urban locations, where the margin for error is minimal.

Beyond the immediate safety concerns, speeding imposes substantial economic costs. These include higher medical expenses due to accident-related injuries, increased repair costs for damaged vehicles, and elevated insurance premiums. Additionally, public resources are strained as governments must allocate more funding to law enforcement and emergency response services to address the consequences of speeding-related incidents.

Environmental impacts are another critical issue associated with speeding. Vehicles traveling at higher speeds typically consume more fuel and emit greater quantities of greenhouse gases and pollutants. This inefficiency contributes to climate change and poses significant public health risks due to increased air pollution.

Traditional speed enforcement methods, such as police patrols, speed cameras, and traffic signs, have been implemented with varying degrees of success. While these measures can deter speeding in specific locations, their effectiveness is often temporary. Drivers may reduce speed in the presence of enforcement mechanisms but tend to resume speeding once the threat of immediate detection is removed. This inconsistent compliance highlights the limitations of existing approaches and underscores the need for more engaging and sustained methods of enforcement.

Various attempts have been made to address these challenges, as demonstrated by prior art. For instance, U.S. Pat. No. 7,123,456 describes a GPS-based device that alerts drivers when they exceed the speed limit. While effective in providing real-time feedback, this system relies solely on the driver's immediate response and does not incentivize long-term compliance. Similarly, U.S. Pat. No. 8,600,700 discloses a system that tracks multiple driving metrics, including speed, allowing users to review their habits via an application. However, this system lacks a focused approach to speed compliance and does not offer tangible rewards for adhering to speed limits. U.S. Pat. No. 9,021,045 introduces a reward system based on telemetric monitoring of driver behavior, including speed, but fails to incorporate a real-time gamified element that could engage drivers more effectively.

Given these shortcomings, there remains a significant opportunity for innovation in this field. The present invention seeks to address the limitations of the prior art by introducing a gamified system specifically designed to incentivize speed compliance. Unlike existing solutions that either passively report information or require manual review, this invention actively engages drivers through real-time interaction and rewards, thereby promoting sustained adherence to speed limits. This novel approach not only aims to improve road safety but also has the potential to reduce the environmental impact of driving by encouraging more fuel-efficient behavior.

SUMMARY OF THE INVENTION

Embodiments of the present disclosure may include a method for gamifying driver speed compliance using a system including a central computer having an operative network connection and a connection to a license authority database through which vehicle ownership can be resolved to vehicle license numbers.

The central computer would also be operatively connected to a score-tracking database in which speed compliance scores in respect of different vehicle license numbers could be recorded.

In conjunction with photo radar capture devices, the system will record captured vehicle speeds and associated license numbers [which would be done regardless in respect of the legal speed enforcement mechanism for which the photo radars would likely be primarily operated]. The software operating on the central computer would assign a positive speed indication in respect of a vehicle in compliance with the speed limit, or a negative speed indication in respect of a vehicle who was speeding. Score tracking records would be maintained within the score tracking database for different vehicles by license number, and for each or selected speed captures by an operatively connected photo radar device for which a positive or negative speed indication was determined the software would either add or subtract credits from the speed compliance score maintained in respect of the corresponding vehicle.

From time-to-time rewards could be made, either to all of the vehicles that within a particular capture or reward tracking timeframe had generated a positive speed compliance score, or using a random number generator or some other method, a winner could be selected from score tracking records having a positive speed compliance score associated therewith. The concept of the awarding of a prize for speed compliance within a reward timeframe would provide motivation for drivers to abide by speed limits.

The system of the present invention could be operatively connected to a license authority database to resolve the ownership of a winning vehicle and notify the owner of their receipt of a prize within or corresponding to a reward timeframe.

In addition to the central computer and the software of the present invention, the system would be operatively connected to a network comprised of at least one photo radar capture device connected via the network to the central computer and capable of capturing a vehicle speed indication including vehicle speed and license number in respect of vehicles passing the capture device on a road surface having an assigned speed limit.

The software associated with the central computer would be responsible for the capture and record what speed and license number indications in respect of at least positive if not also negative speed indication vehicles having passed the at least one photo radar device, to the score tracking database.

On expiry of a particular reward timeframe, in a winner selection step the software could select qualifying score tracking records, being score tracking records with a positive speed compliance score, from the score tracking database. At least one winning score tracking record could be selected from the qualifying score tracking records. Embodiments may also include resolving the license number of the winning score tracking record to a vehicle owner via the license authority database, and providing notification of the details of the winning score tracking record and the corresponding vehicle owner to a user of the central computer.

In some embodiments, the winner selection step may include resetting the speed compliance scores of all the score tracking records to restart another reward timeframe.

In some embodiments, the speed credit may be either a fixed positive or variable positive value based on the vehicle speed. Similarly where a speeder has been identified the speed debit may be either a fixed or variable negative value which would be subtracted from the compliance score maintained in respect of the vehicle.

Where a mathematical selection method is used by the software on the central computer to select one or more qualifying score tracking records, any number of different approaches could be used based upon the nature of the information captured in the score tracking records—for example a simple random number generation could be used to select winners, or statistical analysis to for example the number of positive speed indications as a proportion of the total number of speed indications for the vehicle within the reward timeframe or any number of other types of mathematical approaches will all be understood by those skilled in the art and are all contemplated within the scope of the present invention.

BRIEF DESCRIPTION OF THE DRAWINGS

To quickly identify the discussion of any particular element or act, the most significant digit or digits in a reference number refer to the figure in which that element is first introduced. The drawings enclosed are.

DETAILED DESCRIPTION

Figure 1:
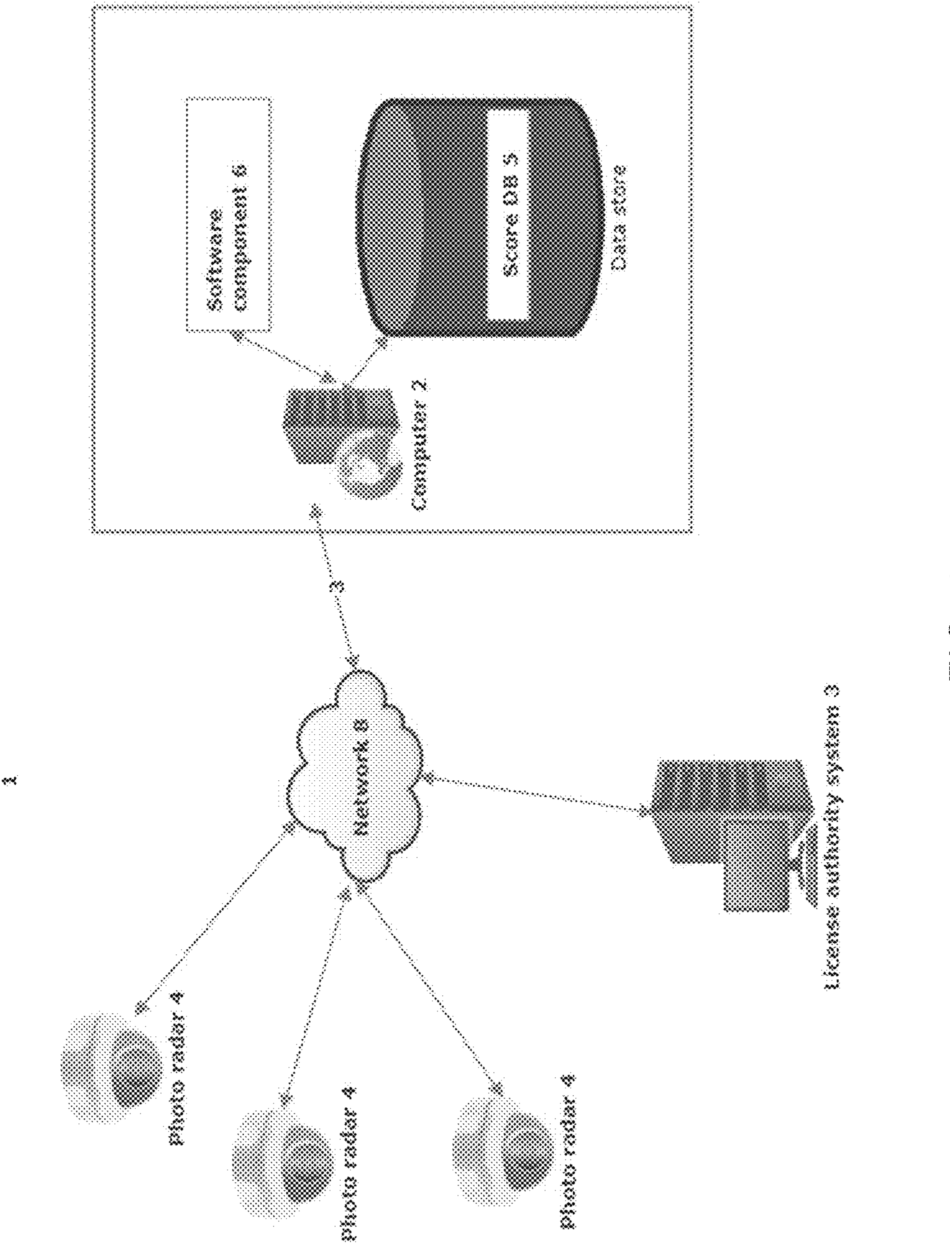
FIG. 1 is a system diagram of one basic embodiment of a system by the present invention.

FIG. 1 is a block diagram showing the elements of one sample of a system 1 in accordance with the method of gamifying driver speed compliance in accordance with the present invention. A central computer 2, operatively connected to a third-party license authority system 3 and at least one photo radar capture device 4, is shown. A score tracking database 5 and a software component 6 responsible for the administration of the steps in the method of the present invention are also shown.

In operation of system 1, during a particular period known as a reward timeframe, the photo radar capture devices 4 would capture speed indications of vehicles in association with particular road areas with speed limits attached therewith. In typical operation of such photo radar capture devices 4, reader speed detection hardware would capture the speed of a passing vehicle and would also capture an image of the associated license plate to resolve the license plate to vehicle ownership and issue a speeding infraction if speeding were taking place at the location. The underlying concept of the present invention is to use the same captured speed and license number identification information as the basis for a compliance contest, where effectively drivers could earn entries into a prize draw by abiding by the speed limit or being within a permitted range of the speed limit at such a location.

The number of photo radar capture devices 4 could be infinite within a single or multiple jurisdictions. All such modifications for the scope of systems in accordance with the remainder the method of the present invention are contemplated within the scope hereof.

The score tracking database 5 could be either posted on or operatively connected to the central computer 2 and could have any number of different types of data structures in either a relational or flat file format, so long as the database and the structure of the score tracking records 7 for individual vehicles were configured in a way to capture or permit the analysis and tracking of the speed compliance scores of vehicles within a reward timeframe. The intended scope and variations on the structure and configuration of the score tracking database 5 will be understood to those skilled in the art and, again is all contemplated within the scope of the present invention.

The primary information required to be stored within score tracking records 7 would be the aggregated speed compliance score of the associated vehicle and the license number or other vehicle or vehicle ownership information identifying same. It will be understood that other fields or data tokens could also be captured or stored within the tracking records 7. All such approaches are also contemplated within the scope of the present invention.

In certain embodiments of system 1, where the law enforcement system operatively monitoring and connected to the network of photo radar capture devices 4 formed the interface between the photo radar capture device 4 and the central computer 2, there may be modifications made to the data structure of the score tracking database 5 to store actual vehicle ownership information instead of license plate numbers in association with particular speed capture readings. It will be understood by those skilled in the art the necessary modifications to the data structure and operation of the remainder of the system and method are intended to be encompassed within the scope hereof in such a case.

Figure 2:
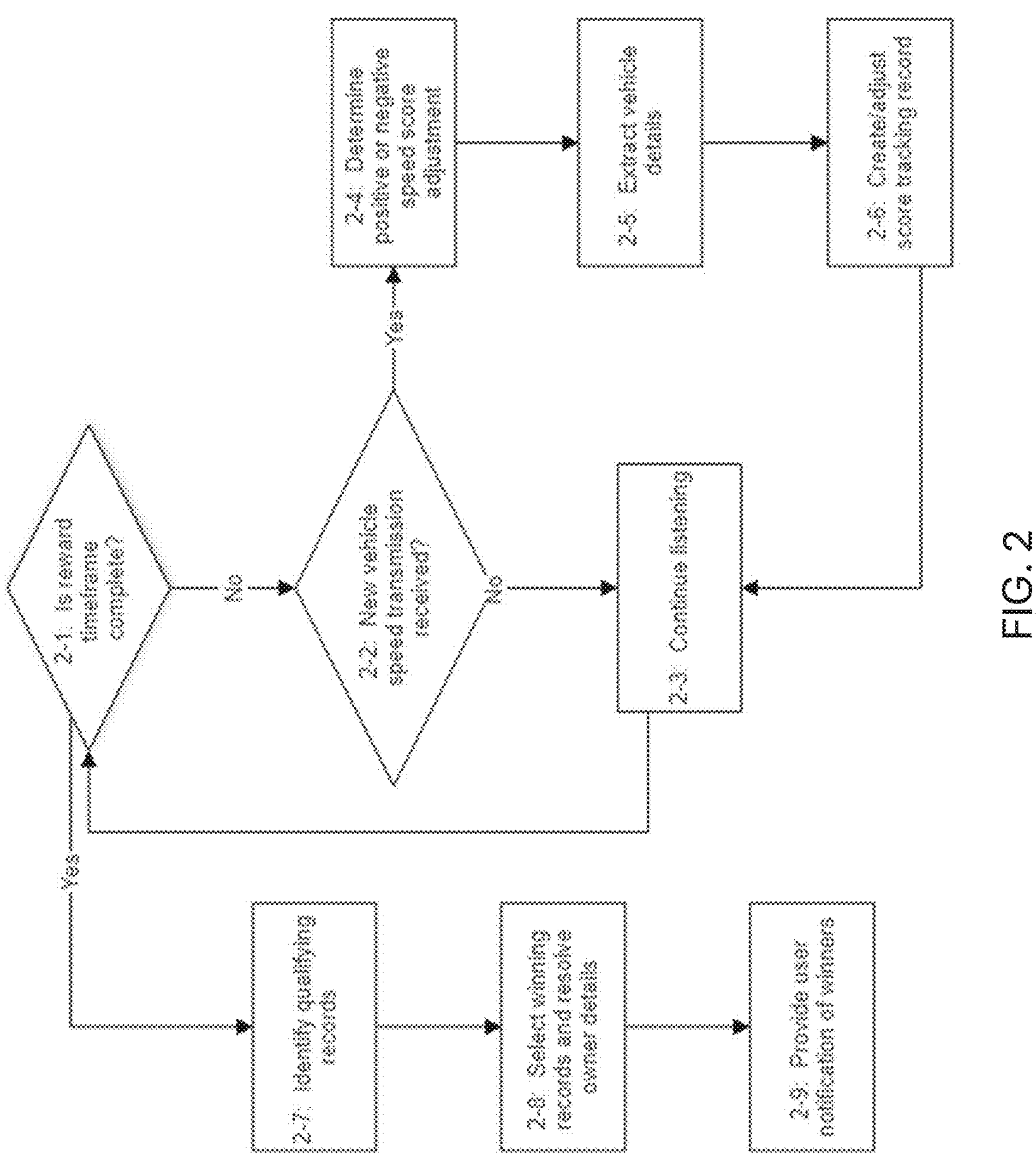
FIG. 2 is a flow chart showing the steps of one embodiment of the method of the present invention.

FIG. 2 is a flowchart demonstrating the steps in one embodiment of the method of the present invention, using a system 1 such as that disclosed in the embodiment shown in FIG. 1. Within a defined reward timeframe, photo radar capture devices 4 would capture the speed of passing vehicles and would associate that speed with the speed limit or a permissible range of speeds for operation at the location of the particular photo radar capture device 4.

In the embodiment of FIG. 2, a listening loop is shown related to the pendency of a reward timeframe in accordance with the method. So long as the reward timeframe as is established and maintained in the memory of the central computer 2 is open, additional information regarding vehicle speed captures by the photo radar capture devices 4 can be received. The opening of the listening loop as shown is at step 2-1. It will be understood to those skilled in the art that this is only one approach which could be taken in terms of the loop and the ongoing active capture of the details of vehicle speed captured by the photo radar capture devices 4. In other embodiments, rather than continuous capture by capture processing of the details as shown in this Figure, periodic data dump files from the pre-existing central server associated with the law enforcement function of the photo radar capture devices 4 could be processed in accordance with the method of the present invention and the attendant modifications to the overarching method will be understood and are understood to be within the scope of the present invention.

Within the reward timeframe, shown at step 2-1, new vehicle speed transmissions captured by the photo radar capture devices 4 could be compiled and transmitted to the central computer 2 of the present invention. On receipt of a packet representing a new vehicle speed capture or transmission at the central computer 2, the capture of which is shown at step 2-2, additional processing would occur. In the absence of any vehicle speed transmission being received at 2-2 the listening loop is shown to continue with the connection of step 2-3 back to the top of the listener.

Where the central computer 2 receives a new vehicle speed transmission packet, shown at decision block 2-2 the next step shown is the parsing of the details thereof in determining any positive or negative speed compliance score increment in respect of the vehicle speed captured and the speed limit at the location of the capturing photo radar device 4. As outlined throughout, in certain embodiments, positive or negative speed compliance score increments could be preset increments. In other cases, mathematical formulas could be attached which would allow for smaller or larger credit or debit amounts depending upon the speed in question.

Also shown, at step 2-5, is the extraction of the vehicle details from the vehicle speed transmission packet, which would effectively be the parsing of the vehicle's license number or other owner information which could be used and stored in a score tracking record 7.

Upon the completion of resolution of the appropriate positive or negative speed compliance score adjustment as well as the vehicle details being the record key for the associated score tracking record 7, the software component on the central computer 2 would create or adjust the necessary score tracking record 7 in the score tracking database, to reflect the up-to-date speed compliance balance or score of the associated vehicle. This is shown at step 2-6. Following the recording and storage of that information in memory of the computer 2, the reward timeframe loop can be seen to continue.

Following the expiry of the reward timeframe, on the yes leg of decision block 2-1, the final processing steps in association with a particular reward timeframe can be. Specifically, the software component on the computer 2 would scan the score tracking records 7 within the database to identify qualifying records which would be any score tracking records 7 with a positive speed compliance score—shown at 2-7. One or more winning records could then be identified or chosen from the qualifying records, shown at step 2-8, and the owner details resolved either from information stored within the score tracking records 7 or by resolution of the vehicle identifying information against a connected license registry system.

Finally, and as shown at step 2-9, user notification to the user of the central computer 2 could be provided to identify winning vehicles or the owners of winning vehicles, so that one or more prizes could be awarded in accordance with whatever selection process was selected were used to identify winning records from the qualifying records.

Following the completion of a reward selection at the end of a reward timeframe, the speed compliance balances in the score tracking records 7 could be reset to zero and a new reward timeframe commenced at any time.

As outlined above it is explicitly contemplated that in alternate embodiments of the method of the present invention, rather than capturing real-time vehicle speed transmission packets at the central computer 2, the database and the score tracking records 7 stored therein could be populated or adjusted based upon serial processing of one or more data files received in respect of multiple speed captures i.e. the computer system already connected to the photo radar capture devices 4 could be used to yield a data dump which could be processed to create or adjust score tracking records 7, as well as identifying qualifying and winning records and awarding prizes for speed compliance. Both such approaches are explicitly contemplated within the scope of the present invention.

In addition to the primary embodiment described, the system can be adapted for various use cases and environments. For instance, in school zones, the system can be configured with stricter compliance thresholds to ensure heightened safety for children. Similarly, in residential areas, the system might integrate with local law enforcement databases to automatically flag repeat offenders for further action. On highways, the system could be linked with traffic management systems to adjust speed limits dynamically based on traffic conditions and weather data, further enhancing the safety and efficiency of road networks.

The photo radar capture devices used in this system may include advanced LIDAR or radar sensors capable of detecting vehicle speed with high precision, even in adverse weather conditions. The central computer may be equipped with multi-core processors and high-capacity storage to handle the large volume of data generated by the photo radar devices. The network architecture could include redundant connections to ensure continuous operation and real-time data processing.

The software algorithms responsible for processing speed data and calculating compliance scores are designed to be highly efficient. For example, a machine learning model could be incorporated to predict driver behavior and adjust the scoring criteria dynamically. The data structures used in the score-tracking database are optimized for rapid read/write operations, with indexed fields for quick access to compliance scores and vehicle data.

The system is designed with flexibility in mind, allowing it to be customized for different jurisdictions and use cases. For example, the reward structure can be adjusted to align with local regulations or to target specific driving behaviors, such as reducing emissions or improving fuel efficiency. The compliance thresholds can be tailored to account for local speed limits, road conditions, and traffic patterns.

Looking forward, the system can be extended to incorporate real-time traffic data, enabling it to adjust speed limits and compliance criteria based on current traffic conditions. Additionally, the reward system could be expanded to include other positive driving behaviors, such as maintaining safe following distances or using turn signals correctly.

Integration with vehicle telematics systems could provide even more granular data, allowing for more personalized feedback and rewards.

The system offers significant advantages over existing speed enforcement methods. Unlike traditional systems that rely on punitive measures, this system uses positive reinforcement to encourage long-term compliance with speed limits. Furthermore, the real-time nature of the system ensures that drivers receive immediate feedback, which is critical for fostering behavioral change.

The system's performance can be measured through various metrics, such as the reduction in speeding-related accidents, improvements in fuel efficiency, and decreases in greenhouse gas emissions. These metrics can be tracked over time, providing valuable data that can be used to refine the system and enhance its effectiveness.

The system is designed to comply with all relevant local and national laws, including those related to data privacy and the legality of reward-based driving incentives. The system's data collection and storage practices adhere to strict data protection regulations, ensuring that personal information is handled securely and transparently. Potential regulatory challenges, such as concerns about driver privacy or the ethical implications of gamifying driving behavior, have been addressed through careful design and implementation.

To further engage drivers, the system can be equipped with a user interface accessible via a mobile app or web portal. Through this interface, drivers can monitor their compliance scores, track their progress over time, and view potential rewards. The interface could also provide personalized tips for improving driving habits, further incentivizing positive behavior. In-vehicle feedback mechanisms, such as dashboard notifications or audio alerts, can provide real-time updates on compliance status, making the system even more interactive and effective.

It will be apparent to those of skill in the art that the present invention can be optimized for use in a wide range of conditions and application by routine modification. It will also be obvious to those of skill in the art that there are various ways and designs to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprises" and "comprising" should be construed as referring to elements, components, or steps in a non-exclusive manner, indicating that the referenced parts, components, or steps may be present, utilized, or combined with other elements, features, or actions not expressly referenced.

What is claimed is:

1. A method for gamifying driver speed compliance using a system comprising:

a. a central computer having an operative network connection and:

i. a connection to a license authority database through which vehicle ownership can be resolved to vehicle license numbers;

ii. a score tracking database comprised of score tracking records each corresponding to a vehicle license number and including a speed compliance score therefor; and iii. a scoring software component for execution of the steps of the method;

b. at least one photo radar capture device connected via the network to the central computer and capable of capturing a vehicle speed indication comprising vehicle speed and license number in respect of vehicles passing the capture device on a road surface having an assigned speed limit, wherein if the vehicle is not exceeding the speed limit the vehicle speed indication is a positive speed indication and if the vehicle is exceeding the speed limit the vehicle speed indication is a negative speed indication;

the method comprising, in respect of a defined time window being a reward timeframe, using the scoring software component on the central computer to:

i. during the reward timeframe, on receipt of a vehicle speed indication received at the central computer via the network:

A. locating or creating a corresponding score tracking record in the score tracking database;

B. if the vehicle speed indication is a positive speed indication, adding an assigned speed credit score to the speed compliance score stored in the corresponding score tracking record;

C. if the vehicle speed indication is a negative speed indication, adding an assigned speed debit score from the speed compliance score stored in the corresponding score tracking record;

ii. on expiry of the reward timeframe, in a winner selection step:

A. selecting qualifying score tracking records, being score tracking records with a positive speed compliance score, from the score tracking database;

B. selecting a winning score tracking record from the qualifying score tracking records;

C. resolving the license number of the winning score tracking record to a vehicle owner via the license authority database; and D. providing notification of the details of the winning score tracking record and the corresponding vehicle owner to a user of the central computer.

2. The method of claim 1 wherein the winner selection step further comprises resetting the speed compliance scores of all the score tracking records to zero to restart another reward timeframe.

3. The method of claim 1 wherein the speed credit score is either:

a. a fixed positive value; or b. a variable positive value based on the vehicle speed.

4. The method of claim 1 wherein the speed debit score is either:

a. a fixed negative value; or b. a variable negative value based on the vehicle speed.

5. The method of claim 1, wherein the first assigned speed credit score is a variable positive value determined by the extent to which the vehicle's speed is below the assigned speed limit within a defined tolerance range.

6. The method of claim 1, wherein the first assigned speed debit score is a variable negative value determined by the extent to which the vehicle's speed exceeds the assigned speed limit, with larger deviations resulting in greater deductions.

7. The method of claim 1, wherein the scoring software component further includes an adaptive algorithm that adjusts the first assigned speed credit score and first assigned speed debit score based on historical driving behavior, traffic conditions, or environmental factors.

8. The method of claim 1, wherein the winner selection step further comprises the use of a random number generator to select the at least one winning score-tracking record from among the qualifying score-tracking records, wherein the probability of selection is weighted based on the magnitude of the positive speed compliance score.

9. The method of claim 1, wherein the reward timeframe is dynamically adjustable based on traffic conditions, seasonality, or specific events that may impact driving behavior.

10. The method of claim 1, wherein the score-tracking database includes additional data fields capturing contextual information related to each speed compliance score, such as the time of day, weather conditions, and traffic density, and wherein this information is used to refine the scoring criteria in real-time.

11. The method of claim 1, further comprising a user interface accessible by the vehicle owner, through which the owner can monitor their speed compliance score, view historical data, and receive notifications of rewards or other incentives.

* * * * *